United States Patent [19]

Bücker

[11] Patent Number: 4,606,297
[45] Date of Patent: Aug. 19, 1986

[54] RINSER FOR PAIL MILKING SYSTEMS

[75] Inventor: Heinrich Bücker, Langenberg, Fed. Rep. of Germany

[73] Assignee: Westfalia Separator AG, Oelde, Fed. Rep. of Germany

[21] Appl. No.: 617,411

[22] Filed: Jun. 5, 1984

[30] Foreign Application Priority Data

Jun. 16, 1983 [DE] Fed. Rep. of Germany ....... 3321752

[51] Int. Cl.$^4$ .............................................. A01J 3/00
[52] U.S. Cl. .............................. 119/14.05; 119/14.18; 134/56 R
[58] Field of Search .................. 119/14.05; 119/14.18; 134/56 R, 57 R

[56] References Cited

U.S. PATENT DOCUMENTS

| | | | |
|---|---|---|---|
| 1,474,669 | 11/1923 | Hapgood | 119/14.05 |
| 1,820,981 | 9/1931 | Fever | 119/14.18 |
| 2,619,974 | 12/1952 | Daley et al. | 134/56 R |
| 2,733,667 | 2/1956 | Hill | 119/14.18 |
| 2,791,964 | 5/1957 | Reeve | 119/14.05 |
| 2,895,450 | 7/1959 | Hope | 119/14.05 |
| 2,897,827 | 8/1959 | Dromgold | 119/14.18 |
| 2,987,065 | 6/1961 | Bender | 134/56 R |
| 2,997,049 | 8/1961 | Thomas | 134/56 R |
| 3,008,450 | 11/1961 | Brunson | 119/14.05 |
| 3,116,714 | 1/1964 | Bender | 134/56 R |
| 3,119,399 | 1/1964 | Bender | 134/56 R |
| 4,476,808 | 10/1984 | Meermoller et al. | 119/14.18 |

FOREIGN PATENT DOCUMENTS

| | | | |
|---|---|---|---|
| 1186677 | 2/1965 | Fed. Rep. of Germany | 119/14.18 |
| 160119 | 8/1957 | Sweden | 119/14.05 |

Primary Examiner—Robert Peshock
Assistant Examiner—J. R. Hakomaki
Attorney, Agent, or Firm—Sprung Horn Kramer & Woods

[57] ABSTRACT

A rinser has a partial-vacuum chamber that constantly communicates with a partial-vacuum line during the rinsing process. The partial-vacuum chamber is separated from the operating space by a diaphragm with an aperture. A spring forces the diaphragm into a position in which is closes off an air inlet into the operating space. Inside the operating space is a float with a shift rod that has a seal at the top that closes off the aperture in the diaphragm as the float rises, interrupting the communication between the operating space and the partial-vacuum line. The breakdown of partial vacuum in the operating space produces a differential pressure on diaphragm, which lifts and releases the air inlet. The seal does not release from the diaphragm until it is forced against a thrust pin loaded by another diaphragm that communicates with the partial-vacuum chamber through one aperture and with the atmosphere through another aperture. The forces exerted on the first diaphragm allow large cross-sections to the atmosphere and to the partial-vacuum line opened and closed, even with a float that, because it carries out only a control function, can be very small.

7 Claims, 3 Drawing Figures

RINSER FOR PAIL MILKING SYSTEMS

BACKGROUND OF THE INVENTION

The present invention relates to a rinser for pail milking systems in which the rinse is suctioned out of a rinsing tub and through teat cups that communicate with a rinser into the partially vacuumized rinser which is mounted above a rinsing tub and equipped with a float and a shift rod, whereby, once the rinser is partly full, the rising float and shift rod close an aperture that communicates with a partial-vacuum line and open an air inlet, whereupon the rinse that has been suctioned into the rinser flows back into the tub subject to gravity.

Rinsers of this type are known in which the buoyancy and weight of the float must be selected to ensure that the forces needed to open the lines leading to the partial-vacuum line and to the atmosphere will be exerted. These opening forces are proportional to the cross-sections of the openings, which must accordingly be kept as short as possible so that both the float and rinser can be small. Small connection cross-sections, however, decelerate the flow of rinse and result in many cases in unsatisfactory cleaning. Satisfactory cleaning can be obtained with the known rinsers only by increasing the cross-sections of the apertures to the partial-vacuum line and atmosphere by a multiple. This in turn makes the rinser larger and undesirably expensive.

Another drawback to the known rinsers is that they themselves get dirty. Since the rinser cannot, because of its mode of operation, be completely filled with rinse, the top of the device does not participate in rinsing. Contaminated drops of rinse are entrained through the connection to the partial-vacuum line when air is suctioned out and settle to some extend on the unrinsed portion of the rinser. The rinser must accordingly be cleaned manually subsequent to rinsing.

SUMMARY OF THE INVENTION

The object of the present invention is to improve the known rinser in such a way as to accelerate the flow of the rinse and hence obtain better cleaning with no increase in size.

This object is attained in accordance with the invention, wherein the rinser has a partial-vacuum chamber that is in constant communication with the partial-vacuum line during the rinsing process, wherein the partial-vacuum chamber is separated from the rinser operating space by a diaphragm with an aperture and the diaphragm is forced by a spring in the partial-vacuum chamber into a position in which it closes off the air inlet into the operating space and wherein the shift rod on the float has a seal at the top that closes off the aperture in the diaphragm when the float rises.

Closing off the opening in the diaphragm interrupts the communication between the operating space and the partial-vacuum line, and partial vacuum breaks down in the operating space as rinse continues to flow in. The difference in pressure between the operating space and the partial-vacuum line acts on the overall surface of the diaphragm and lifts it, releasing the air inlet, which increases the pressure difference even more. The seal, which also adheres to the diaphragm as the result of differential pressure, and shift rod lift the float along with the diaphragm until the seal finally releases from the diaphragm because of the weight of the float. Thus, since the total force generated by the diaphragm as the result of differential pressure is available to open and close the apertures to the partial-vacuum line and to the atmosphere, the apertures can be large and the float itself will only have to carry out a control function, so that it can be extremely small. The high level of turbulence of the rinse flowing into the rinser operating space at a high speed will thoroughly rinse the operating space itself.

One practical embodiment of the invention has, in the partial-vacuum chamber, a thrust pin that the seal is forced against when the diaphragm is raised, so that the weight of the float pulling on the seal is augmented by the force generated by the diaphragm.

There is preferably a pressure-loaded pin in the partial-vacuum chamber that determines in a practical way when the seal is released from the diaphragm.

The thrust pin can be pressure loaded for example by another diaphragm that communicates with the diaphragm chamber through one aperture and with the atmosphere through another aperture.

The thrust pin can, on the other hand, also be pressure loaded by a compression spring with a tension that can be adjusted by means of a setscrew.

To accelerate emptying the operating space the operating space preferably has an outlet containing a check valve that closes while rinse is being suctioned into the operating space and opens while the operating space is being aerated.

The operating space in one particularly practical embodiment of the invention is divided into a float chamber and an intermediate chamber that communicate through a channel, with the shift rod on the float, which is located in the float chamber, extending through the channel into the intermediate chamber and surrounded in the float chamber by an axially movable sleeve with a flange attached to it that blocks off the channel between the float chamber and the intermediate chamber when the sleeve is in its upper position and with the shift rod having a liquid deflector in the vicinity of the intermediate chamber.

As partial vacuum builds up in the rinser operating space, the sleeve is lifted axially along with its flange by the high volume of air flowing in the channel and blocks off the channel. The air now flows only through the sleeve itself, and drops of entrained liquid are precipitated by the liquid deflector and accumulate above the flange in the channel. When communication with the partial-vacuum line is interrupted, the sleeve will drop back onto the float, releasing the channel again, and the accumulated liquid will flow into the float chamber. This embodiment prevents drops of liquid from getting into the partial-vacuum line.

Some preferred embodiments of the invention will now be described with reference to the attached drawings, wherein

DETAILED DESCRIPTION OF THE PREFERRED EMBODIMENTS

Figure 1:
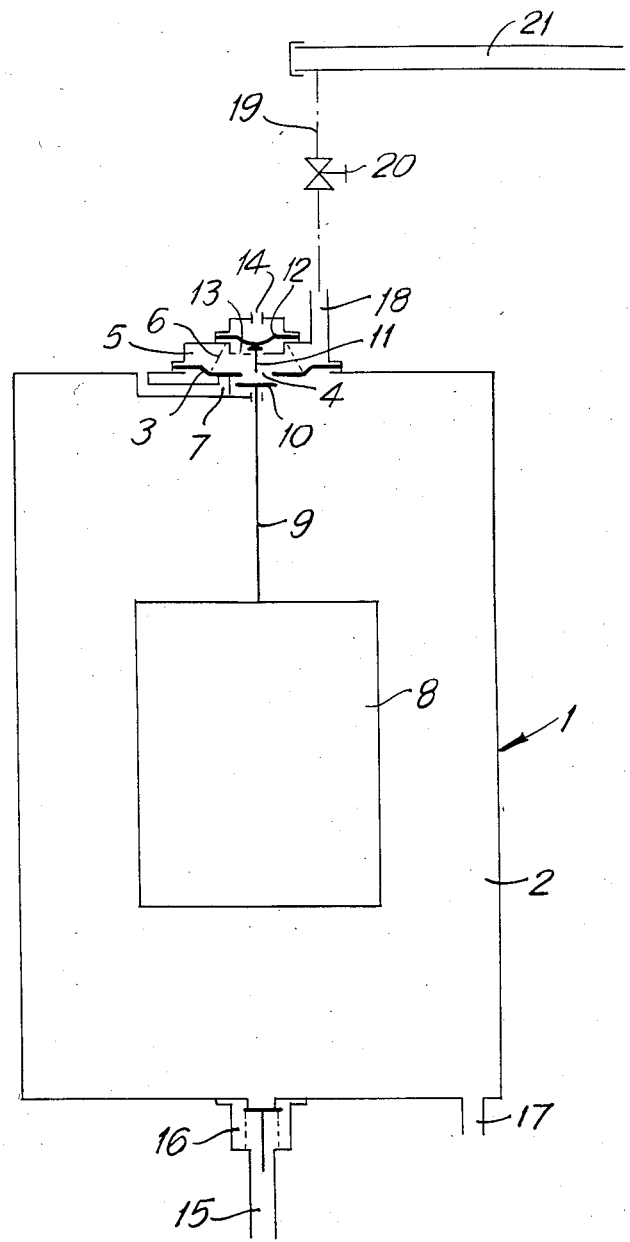
FIG. 1 is a schematic drawing of a rinser in accordance with the invention.

The rinser 1 illustrated in FIG. 1 has an operating space 2 that is separated by a diaphragm 3 with an aperture 4 from a partial-vacuum chamber 5. Diaphragm 3 is forced by a spring 6 into a position in which it closes off an air inlet 7 that opens into operating space 2. A float 8 in operating space 2 is provided with a shift rod 9 that has at the top a seal 10 that closes off the aperture 4 in diaphragm 3 when float 8 travels upward. In partial-vacuum chamber 5 is a thrust pin 11. Pressure is applied to thrust pin 11 by a diaphragm 12 that communicates with partial-vacuum chamber 5 through an aperture 13 and with the atmosphere through an aperture 14. Operating space 2 has an outlet 15 containing a check valve 16. Operating space 2 communicates with the teat cup to be rinsed through connection 17. Partial-vacuum chamber 5 communicates with partial-vacuum line 21 through a connection 18, a line 19, and a valve 20.

Before rinser 1 is turned on, the milk hose, not illustrated, of a teat cup immersed in a rinse-filled tub is connected to connection 17. Valve 20 is opened, establishing communication between partial-vacuum chamber 5 and partial-vacuum line 21. Partial vacuum propagates through the aperture 4 in diaphragm 3 in to operating space 2, suctioning rinse through the teat cup and into operating space 2. The rinse flowing into operating space 2 has so much turbulence due to the large cross-section of the air passages that the operating space is also constantly rinsed. The rising level of liquid in operating space 2 lifts float 8 until seal 10 rests against the aperture 4 in diaphragm 3, interrupting the flow of air to partial-vacuum line 21. As it continues to flow into operating space 2, the rinse decreases the partial vacuum in the operating space and the difference in pressure between the operating space and partial-vacuum chamber 5 lifts diaphragm 3 off of air inlet 7. Atmospheric pressure now prevails in operating space 2 and the rinse flows subject to gravity out of the operating space and back into the rinsing tub through the teat cup and through the now open check valve 16. Diaphragm 3 is lifted even higher by the increasing pressure difference, and seal 10, which is adhering to the diaphragm, is forced against thrust pin 11, which is forced against the seal 10 by diaphragm 12, which is subjected to atmospheric pressure at the top and with partial vacuum on the bottom. As soon as the liquid in operating space 2 drops to a level at which the weight of float 8 plus the force exerted by thrust pin 11 on seal 10 is more powerful than the force with which seal 10 adheres to diaphragm 3, the seal will release from the diaphragm. The opening of aperture 4 will result in pressure equilibrium between operating space 2 and partial-vacuum chamber 5. Spring 6 will again force diaphragm 3 against air inlet 7, closing it, whereupon partial vacuum will build up again in operating space 2 and the rinsing cycle will be initiated again.

Figure 2:
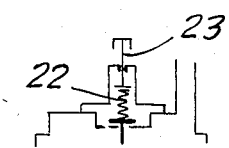
FIG. 2 illustrates the pressure-loaded pin with the compression spring and setscrew.

Thrust pin 11 can alternatively be loaded, as illustrated in FIG. 2, by a tensioned spring 22. The tension on spring 22 can be adjusted by a setscrew 23 to determine the optimal point in time for seal 10 to release from diaphragm 3.

Figure 3:
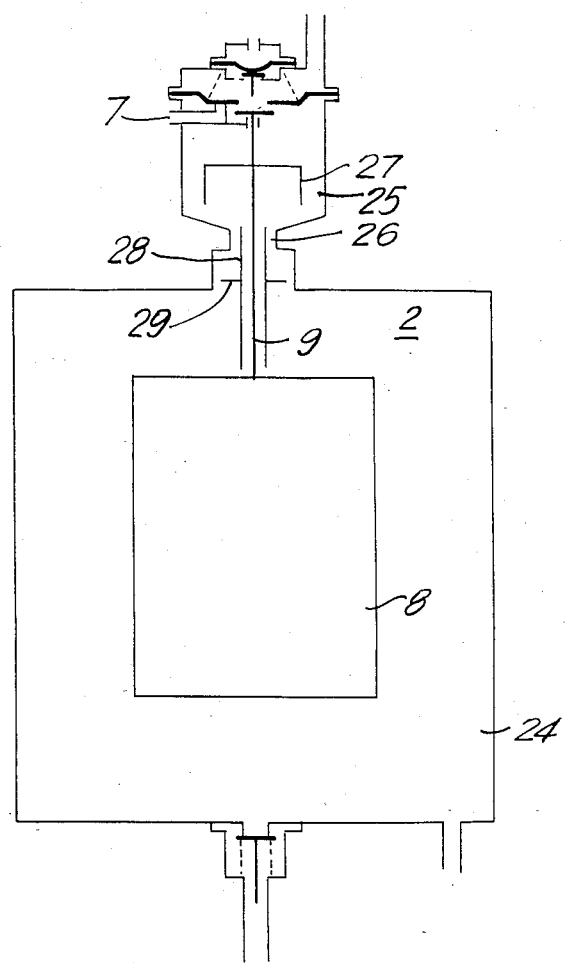
FIG. 3 illustrates a rinser with a divided operating space.

FIG. 3 illustrates an embodiment in which the operating space is divided into a float chamber 24 and an intermediate chamber 25 that communicate through a channel 26. The shift rod 9 on float 8, which is located in float chamber 24, extends into intermediate chamber 25, where it is surrounded by an axially movable sleeve 28 with a flange 29 attached to it. As partial vacuum builds up, sleeve 28 is lifted by the high speed of air flowing in channel 26 and blocks off the channel. The air now flows only through sleeve 28 itself. Drops of entrained liquid are precipitated by liquid deflector 27 and accumulate above flange 29. When intermediate chamber 25 is aerated through air inlet 7, sleeve 28 drops again and the liquid accumulated in channel 26 will flow into float chamber 24.

It will be appreciated that the instant specification and claims are set forth by way of illustration and not limitation, and that various modifications and changes may be made without departing from the spirit and scope of the present invention.

What is claimed is:

1. In a rinser for a milking system for suctioning rinse from a rinsing tub through a teat cup, wherein the rinser is mounted above the rinsing tub and connected to a partial vacuum line during use and includes an operating space having a connection connectable to the teat cup for communicating with the rinse in the rinsing tub and means including a float in the operating space for alternately effecting communication of the operating space to the partial vacuum line and the atmosphere, the improvement wherein the means comprises: means forming a partial vacuum chamber in constant communication with the partial-vacuum line during rinsing; an air inlet in constant communication with the atmosphere; a first diaphragm separating the partial vacuum chamber from the operating space and movable in response to a pressure differential in the partial vacuum chamber and the operating space from a first position wherein the first diaphragm closes the air inlet to a second position wherein the air inlet is open, wherein the first diaphragm has an aperture therein providing communication between the partial vacuum chamber and the operating space; means biasing the first diaphragm into the first position; a shift rod connected to the float and having sealing means thereon for closing the aperture in the diaphragm when a preselected level of rinse is present in the operating space; and means for opening the aperture when the first diaphragm moves into the second position.

2. The rinser as in claim 1, wherein the means for opening the aperture comprises a thrust pin in the partial-vacuum chamber for contacting the sealing means.

3. The rinser as in claim 2, further comprising means pressure loading the thrust pin.

4. The rinser as in claim 3, wherein the means pressure loading the thrust pin comprises a second diaphragm in communication with the partial vacuum chamber through a first aperture and with the atmosphere through another aperture.

5. The rinser as in claim 3, wherein the means pressure loading the thrust pin comprises a spring and a set screw for adjusting the tension thereof.

6. The rinser as in claim 1, further comprising an outlet from the operating space having a check valve therein.

7. The rinser as in claim 1, further comprising means dividing the operating space into a float chamber and an intermediate chamber that communicate through a channel, wherein the shift rod extends from the float in the float chamber, into the intermediate chamber, a liquid deflector, on the shift rod and an axially movable sleeve surrounding the shift rod in the float chamber and having a flange for blocking off the channel when the sleeve is in an upper position.

* * * * *